(12) United States Patent
O'Sullivan et al.

(10) Patent No.: US 8,660,894 B2
(45) Date of Patent: Feb. 25, 2014

(54) ADVERTISING PROXIMITY ROUTE SELECTION

(75) Inventors: Patrick J. O'Sullivan, Dublin (IE); Fred Raguillat, Meath (IE); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/435,065

(22) Filed: Mar. 30, 2012

(65) Prior Publication Data

US 2012/0191537 A1    Jul. 26, 2012

Related U.S. Application Data

(63) Continuation of application No. 12/821,665, filed on Jun. 23, 2010.

(51) Int. Cl.
*G06Q 30/00*    (2012.01)

(52) U.S. Cl.
USPC ............ 705/14.4; 705/14.58; 705/14.62

(58) Field of Classification Search
USPC ................. 705/14.4, 14.58, 14.62
See application file for complete search history.

(56) References Cited

U.S. PATENT DOCUMENTS

| | | | |
|---|---|---|---|
| 6,675,165 B1 | 1/2004 | Rothschild | |
| 6,775,613 B2 | 8/2004 | Burt et al. | |
| 7,403,978 B2 | 7/2008 | Parekh et al. | |
| 7,408,502 B2 | 8/2008 | Percy et al. | |
| 7,451,233 B2 | 11/2008 | Parekh et al. | |
| 7,577,244 B2 | 8/2009 | Taschereau | |
| 7,586,439 B2 | 9/2009 | Percy et al. | |
| 7,698,377 B2 | 4/2010 | Parekh et al. | |
| 8,024,111 B1 * | 9/2011 | Meadows et al. ............. 701/414 |
| 2002/0091568 A1 | 7/2002 | Kraft et al. | |
| 2003/0046158 A1 | 3/2003 | Kratky | |
| 2004/0193492 A1 | 9/2004 | Applebaum | |
| 2004/0203860 A1 | 10/2004 | Fellenstein et al. | |
| 2005/0221843 A1 | 10/2005 | Friedman et al. | |
| 2006/0229778 A1 | 10/2006 | Obradovich et al. | |
| 2007/0083428 A1 | 4/2007 | Goldstein | |
| 2007/0174259 A1 | 7/2007 | Amjadi | |
| 2007/0239348 A1 | 10/2007 | Cheung | |

(Continued)

OTHER PUBLICATIONS

Gyozo Gidofalvi, Hans R. Larsen, Torben B. Pedersen, Estimating the Capacity of the Location—Based Advertising Channel, Abstract, Proceedings of the International Conference on the Management of Mobile Business, 2007, pp. 1-2, Association for Computing Machinery (ACM), Published at http://portal.acm.org/citation.cfm?id=1270392.1271172.

(Continued)

*Primary Examiner* — John G Weiss
*Assistant Examiner* — Sam Refai
(74) *Attorney, Agent, or Firm* — Lee Law, PLLC; Christopher B. Lee (57) ABSTRACT

A request for route information to a destination is received by a route processing module. Available routes to the destination are determined in response to receiving the request. It is determined, for at least one available route to the destination, whether the available route provides proximity to at least one targeted advertisement. At least one available route to the destination is provided upon determining that the available route provides the proximity to the targeted advertisement.

7 Claims, 6 Drawing Sheets

(56) References Cited

U.S. PATENT DOCUMENTS

2008/0281516 A1* 11/2008 Cummings ................ 701/210
2009/0088965 A1    4/2009 Burckart et al.
2009/0210148 A1    8/2009 Jayanthi
2010/0088012 A1    4/2010 O'Sullivan et al.
2011/0307167 A1* 12/2011 Taschereau ................ 701/200

OTHER PUBLICATIONS

Author Unknown, Press Release: Nextar to Unveil GPS Unit That Provides Live Free Traffic Information, Website/page, Printed from website on Jun. 1, 2010, pp. 1-2, Nextar Inc., Published at http://www.nextar.com/frontend/press_detail.asp?id=310966771.

Author Unknown, What is amAze, Website/page, Printed from website on Jun. 1, 2010, pp. 1-2, LocatioNet Systems Ltd., Published at http://www.amazegps.com/?language=international&referrer=6&page=about.

Author Unknown, Elephant Traffic—Harnessing Direct Navigation for Advertising, Website/page, Sep. 22, 2009, pp. 1-4, Dnxpert: Domain News Blog, Published at http://www.dnxpert.com/2009/09/22/elephant-traffic-harnessing-direct-navigation-for-advertising/.

Carl A. Gunter, Michael J. May, Stuart G. Stubblebine, A Formal Privacy System and its Application to Location Based Services, Conference Article, 2004, pp. 1-28, Privacy Enhancing Technologies (PET) 4th International Workshop, Toronto, Canada.

United States Patent and Trademark Office, Office Action for U.S. Appl. No. 12/821,665, Aug. 29, 2012, pp. 1-14, Alexandria, VA, USA.

United States Patent and Trademark Office, Office Action for U.S. Appl. No. 12/821,665, Jan. 31, 2013, pp. 1-19, Alexandria, VA, USA.

United States Patent and Trademark Office, Office Action for U.S. Appl. No. 12/821,665, Jun. 19, 2013, pp. 1-20, Alexandria, VA, USA.

United States Patent and Trademark Office, Notice of Allowance for U.S. Appl. No. 12/821,665, Oct. 16, 2013, pp. 1-22, Alexandria, VA, USA.

* cited by examiner

ADVERTISING PROXIMITY ROUTE SELECTION

RELATED APPLICATIONS

This application is a continuation of and claims priority to and claims the benefit of U.S. patent application Ser. No. 12/821,665 titled "ADVERTISING PROXIMITY ROUTE SELECTION," which was filed in the United States Patent and Trademark Office on Jun. 23, 2010, and which is incorporated herein by reference in its entirety.

BACKGROUND

The present invention relates to route selection and determination. More particularly, the present invention relates to advertising proximity route selection.

Global positioning system (GPS) navigation allows users to plot a path between geographic points. Users enter information, such as a desired ending point, into a navigation device, which uses the GPS system. The navigation device processes the entered information and provides an available route to the destination.

BRIEF SUMMARY

A method includes receiving, via a route processing module, a request for route information to a destination; determining, in response to receiving the request, available routes to the destination; determining, for at least one available route to the destination, whether the at least one available route provides proximity to at least one targeted advertisement; and providing the at least one available route to the destination upon determining that the at least one available route provides the proximity to the at least one targeted advertisement.

A system includes a memory that stores advertising location information; and a processor programmed to: receive a request for route information to a destination; determine, in response to receiving the request, available routes to the destination; determine, for at least one available route to the destination using the advertising location information, whether the at least one available route provides proximity to at least one targeted advertisement; and provide the at least one available route to the destination upon determining that the at least one available route provides the proximity to the at least one targeted advertisement.

A computer program product comprising a computer readable storage medium including computer readable program code, where the computer readable program code when executed on a computer causes the computer to: receive a request for route information to a destination; determine, in response to receiving the request, available routes to the destination; determine, for at least one available route to the destination, whether the at least one available route provides proximity to at least one targeted advertisement; and provide the at least one available route to the destination upon determining that the at least one available route provides the proximity to the at least one targeted advertisement.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides advertising proximity route selection. Available routes are selected in response to route requests based upon physical advertising location proximity relative to the available routes. As such, advertising influence prioritizes route selection. The advertising influence may be increased by determination of a characteristic or demographic associated with a route request (e.g., a characteristic associated with the requester, a vehicle of the requester, etc.) and selection of routing including targeted advertising directed toward the determined characteristic(s). Incentives may be provided to route requesters to accept routes with higher advertising proximity count in exchange for discounted services, such as traffic or weather information feeds. Such incentives may be based upon targeted advertisements proximate to the provided route. Further, route providers may increase revenues by providing advertising proximity route selection and by accounting to advertisers for a number of impressions (i.e., viewings) delivered to route requesters. Accordingly, advertisers may have increased control and influence over the number of impressions associated with physical advertising and may receive feedback for physical advertising impressions to determine physical advertising location efficiency.

For purposes of the present subject matter, the terms "proximity" and "proximate" shall include any distance that provides reasonable visibility to information, such as an available advertisement or targeted advertisement, acceptable to a user of the subject matter described. Additionally, the terms "proximity" and "proximate" shall include what is commonly termed "near" or "close by" or "within view"—generally meaning any distance that provides reasonable visibility for viewing of information and advertisements acceptable to a user of the subject matter described based upon a size of the given information or advertisement (e.g., within fifty (50) feet, within one hundred (100) feet, etc.). These terms, while difficult to precisely define are well understood by those skilled in the art.

Advertising proximity route selection may be performed via a route processing module of a mobile device, a wireless base station, a server, or other device associated with a navigation infrastructure, such as a global positioning system (GPS) navigation infrastructure, or other infrastructure appropriate for a given implementation. As such, a route request may be received via a mobile device and processed locally. Alternatively, the request may be forwarded to a server or wireless base station with advertising proximity route selection capabilities for processing, and a route returned to the mobile device. The physical advertising locations may include billboards, electronic and non-electronic signs, or any other physical advertising proximate to available routes.

Route requesters may include individual users of a navigation infrastructure service and may also include commercial entities, such as public or private transportation carriers, and other entities. Route requesters may register for the advertising proximity route selection as a service. Registration may include providing information to assist with advertising proximity route selection to an advertising proximity route selection service provider. Providing the information to assist with advertising proximity route selection may include creation of a route requester profile or completion of account information to facilitate targeted advertising selection of interest to the route requester, or in the case of a commercial entity requesting a route, to passengers of the route requester.

Advertising proximity route selection service providers may offer paid or discounted route selection services in exchange for route requesters allowing route selection proximate to physical advertising locations. As such, the registration process or an account update process may include paid and discounted route selection service offerings that may be selected during registration or account updating by the route requester. For example, an advertising-paid model, where traffic information is discounted or free, may be selected by the route requester during registration or account update processing. The route requester may further be provided with options for route deviation constraints associated with the advertising proximity route selection service to indicate a driving impact the route requester is willing to accept in exchange for the possible service offerings (e.g., discounted traffic or weather information). For example, a route requester may select a travel impact value, such as to have a driving impact of less than five (5) additional minutes of drive time, or a driving impact of zero (0) additional minutes of drive time. Additionally, speed limits may be considered in association with a size of an advertisement to help ensure safety of advertising impressions along selected routes.

Determinations of characteristics of a route requester may also be performed in an automated manner. For example, a search on public information associated with the route requester may be performed to determine a type of vehicle or other information associated with the route requester to improve targeted advertising selection. Many other possibilities exist for configuring the advertising proximity route selection described herein for targeted advertising and all are considered within the scope of the present subject matter.

Advertising "success" may also be tracked along with advertising proximity route selection and advertising impression efficiency may be correlated with route selection. For example, where an advertising proximity route is selected that traverses a roadway or other path proximate to a retail location (e.g., store, restaurant, etc.), the route processing module may store the selected route in conjunction with the retail location identification information. If the route requester stops at the store, that action may be documented as a "success." A success may be used to influence an award for accepting the advertising proximity route selection. Success or lack of success may influence the amount of award (up or down) for subsequent routing.

Success may further be determined over time. As such, a success may be documented based upon a configurable success time window within which a possibility of success associated with advertising proximity route selection may be considered. For example, if the route requester passes a retail location and does not stop initially, but subsequently returns to the retail location within forty-eight (48) hours, that subsequent stop at the store may be still considered a success where the configurable success time window is equal to or less than forty-eight hours. If the route is to pass a billboard advertising a product and the product is purchased within the next ninety-six (96) hours, that purchase may also be considered a success where the configurable success time window is equal to or less than ninety-six hours. Many other variations on determining success of advertising impression efficiency of advertising proximity route selection are possible and all are considered within the scope of the present subject matter.

The route requester profile described above may also include additional information that may be selected during registration or account updating by the route requester. For example, route requester interests, such as interests in particular goods, products, stores, etc., may be included in the route requester profile. The route requester profile may also include route requester preferences, such as the route requester not wishing to see an advertisement without a proven track record of "success," or not wishing to be routed past undesirable businesses. As such, a route may be provided based upon one or more routing preferences associated with the route requester. Providing a route based upon one or more routing preferences associated with the route requester may include determining, based upon a profile associated with the route requester, that a category of merchant is to be avoided during routing and a route that avoids the category of merchant may be provided.

Additionally, a route requester wishing to expand its horizons may be interested in being exposed to new things and ideas through advertising proximity route selection. As such, the route requester may choose an option during registration or account updating that configures a limit on a number of advertising impressions in a selected domain without success. Beyond that configured limit of advertising impressions, advertising proximity route selection including advertisements in that selected domain may be diminished or discontinued for future route selections, potentially for a configurable amount of time. For example, where a route requester has been exposed to physical advertisements in a domain of kitchen appliances for a number of times (e.g., five (5) times) equivalent to the configured limit of advertising impressions without "success," routes including advertisements in the selected domain of kitchen appliances may be diminished or discontinued, potentially for a configurable amount of time. In conjunction with a configured limit of advertising impressions without "success," route requesters may configure alternative selected domains of interest and may configure random selection via the route processing module for alternative selected domains of interest. In this manner, the route requester may choose to be routed so as to be exposed to other domains of advertising.

Additionally, route requester preferences may be utilized to alert or notify the route requester when proximity to a location associated with at least one targeted advertisement, such as to a preferred store or restaurant, is observed. In such a situation, the route requester may also be provided with an option to deviate temporarily from their route. Associated with this alert may be a unique code associated with a discount at the particular or some other proximate retail location. If the route requester presents the code at the retail location, the associated discount may be applied to a purchase. For example, if a route requester is within a particular advertiser's demographic and is routed past a particular physical advertisement proximate to a provided route, the route requester may be alerted and/or notified in response to recognition by a route processing module that the route requester is within the particular demographic. The alert and/or notification may include a unique code associated with a discount from the advertiser directed to an interest of the route requester based upon the route requester's preferences. The route requester may deviate at that time or at a later time, and travel to the advertiser's location and redeem the unique code to benefit from the associated discount. Further, commissions may be provided by advertisers to route providers in association with such a purchase to allow the route providers to benefit from the commission from the retail transaction and to further incentivize the route providers. Regular online updates may be made available to the route requester, and map updates as well as promotional offer updates may be downloaded for use by the route requester.

Advertising proximity route selection may also take into account other factors. For example, if a route requester's vehicle is low on fuel, the route processing module may detect that condition and route the route requester past a gas station to improve the possibility of success. Additionally, from biometric signs, speech recognition, driving duration, or other factors, the route processing module may determine that the route requester is hungry and route past a restaurant or other facility. Previous shopping history may also be used to improve route selection efficiency.

Many other variations on the processing described above are possible and all such variations are considered within the scope of the present subject matter. For example, and without limitation, the following provides a partial list of possible variations. Where an advertising proximate route is equivalent in driving efficiency to a route selected without influence of advertising, the advertising proximate route may be provided to the route requester. Additionally, where an advertising proximate route has less than a configured percent or distance difference in efficiency relative to an optimal driving route, the advertising proximate route may be provided. Further, advertising proximate routing may be sold by "impression," and route requester incentives may be based on the number of impressions they are exposed to during travel (e.g., that they actually travel proximate to). Additionally, to further incentivize consumers to utilize advertising proximity route selection, advertisers may supply or subsidize the mobile device (e.g., GPS or routing system) or associated service (e.g., traffic or weather) to the consumer. The route requester may be provided with points or coupons associated with advertised merchants. The route requester may also be notified of proximity to an advertised merchant and a distance relative to the route to the advertised merchant. Further, merchants associated with advertising used during advertising proximity route selection may be chosen based upon a database look-up of the route requester's buying patterns. Additionally, the merchant to which to travel may be chosen by the route requester in response to a prompt to select one of a group of stores in a given domain (e.g., home improvement stores).

The present subject matter also includes adaptive behavioral-based routing capabilities. For example, frequently traveled routes (e.g., day-to-day routes such as between home and work) may be configured. Additionally, stops made daily, weekly monthly, and yearly (e.g., coffee shops, grocery stores, clothing retail shops, car service centers, etc.) may be configured. Based on this behavioral information, the route processing module may automatically change route provisions at certain times of the day, week, month, or year based upon this pre-configured behavioral-based routing information. As such, on a day the grocery shopping is due, the day of the month the car service is due, or on a day where another scheduled or configured activity is due, route selection may be updated automatically for consideration of the activity.

As another example of behavioral-based routing capabilities, non-configured route opportunities may be requested by or chosen for the route requester when requesting a route based upon a deviation from predominant travel routines, such as a non-work day or a vacation. For example, on a Saturday morning a route may be provided to a new store or destination, or on a vacation a route may be provided to a scenic overlook.

Themes may also be applied to advertising proximity route selection to allow route selection associated with a purpose of a route request. For example, the route requester may also indicate that the route is requested for a "weekend getaway." In such a case, advertising proximity route selection may be configured for a "holiday purchase" theme. Many other variations on adaptive behavioral-based routing are possible and all are considered within the scope of the present subject matter.

It should further be understood that the present subject matter may include determining a starting location, and responsive to the starting location and the destination location, a determination may be made as to at least one targeted advertisement in proximity to a local region containing the starting location and destination location. As such, the present subject matter may consider regional opportunities for advertising proximity route selection.

Further, at least one route may be determined that incorporates a targeted advertisement as a waypoint, and for which the characteristics of the route fulfill specified criteria for advertising proximity route selection. The specified criteria may include travel length, a duration of time, traffic, avoidance of highways, etc. Specified criteria may further include preferred highways, no highways, toll roads, no toll roads, and other criteria as appropriate for a given implementation. As such, a preferred or primary route may be determined based upon specified criteria for advertising proximity route selection.

The advertising proximity route selection described herein may be performed in real time to allow prompt selection of routes based upon physical advertising proximate to provided routes. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
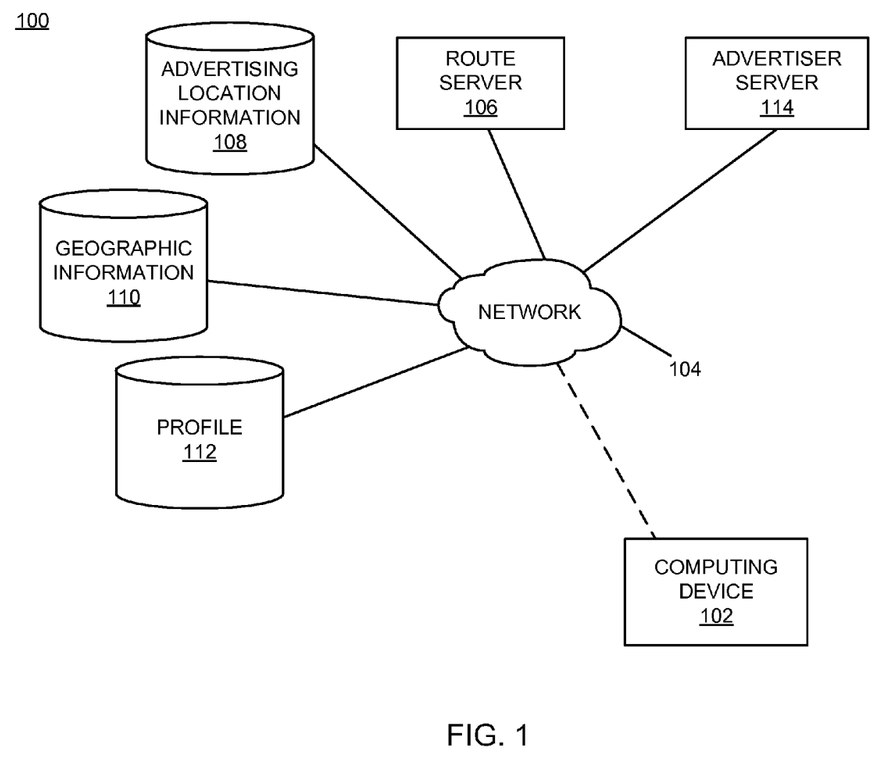
FIG. 1 is a block diagram of an example of an implementation of a system for advertising proximity route selection according to an embodiment of the present subject matter.

FIG. 1 is a block diagram of an example of an implementation of a system 100 for advertising proximity route selection. A computing device 102 communicates via a network 104 with a route server 106. The network 104 may include one or more wired or wireless networks as appropriate for a given implementation. However, it is understood that the present example shows the computing device 102 interconnected via a dashed-line representation to illustrate that the computing device 102 may be interconnected via a wireless connection, for example to a base station (not shown), in association with the network 104. The nature of the example computing device 102 is described in more detail below along with the network 104.

As will be described in more detail below in association with FIG. 2 through FIG. 5, the computing device 102 provides automated advertising proximity route selection. The automated advertising proximity route selection is based upon physical advertising location proximity relative to the available routes. The automated advertising proximity route selection may alternatively be performed by or in conjunction with the route server 106 without departure from the scope of the present subject matter. Accordingly, many variations on the processing described herein are possible and all are considered within the scope of the present subject matter.

It should be noted that the computing device 102 may be a portable (e.g., mobile) computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 and its constituent parts may include any form of interconnections suitable for the intended purposes, including private or public networks such as one or more intranets or the Internet, respectively, direct inter-module interconnection, dial-up, wireless, or any other interconnection mechanism capable of interconnecting the respective devices.

It should further be understood that the present example utilizes global positioning system (GPS) location processing for both a location of the computing device 102 and to identify locations of physical advertising proximate to available routes that may be selected in association with the automated advertising proximity route selection described herein. In such an implementation, GPS satellites (not shown) provide signaling that allows the computing device 102 to calculate its location and to determine its location relative to proximate advertising for route reporting and efficiency determinations. Location calculations are often represented in the form of latitudinal and longitudinal coordinates, though other forms of representation are possible.

Continuing with the description of FIG. 1, an advertising location information database 108, a geographic information database 110, and a profile database 112 are illustrated. The advertising location information database 108 stores information regarding physical locations of advertising proximate to roadways and travel ways. The geographic information database 110 stores information regarding roadways and travel ways, such as maps, route identifiers, distance information, and other information useable for route selection. The profile database 112 stores information associated with route requester characteristics, advertising impression preferences, and other information as described above.

An advertising server 114 represents a communication interface for one or more advertisers that provide information about advertising locations for storage within the advertising location information database 108. The advertising server 114 may also be utilized for obtaining advertising incentives and for reporting advertising impressions, and for other purposes, as described above and in more detail below. The advertising server 114 is shown as a single device for ease of illustration purposes. However, it is understood that each advertiser may maintain its own server or other variations may apply as appropriate for a given implementation.

It should also be understood that the advertising location information database 108, the geographic information database 110, and the profile database 112 are illustrated as three separate devices for purposes of the present example. However, these devices may be combined into a single storage device (as shown in association with the example of FIG. 2 below) or each partitioned into multiple storage devices without departure from the scope of the present subject matter. Information may be stored within the respective storage devices in the form of tables or other arrangements accessible by the computing device 102, the route server 106, the advertising server 114, and/or other device(s) as appropriate.

Figure 2:
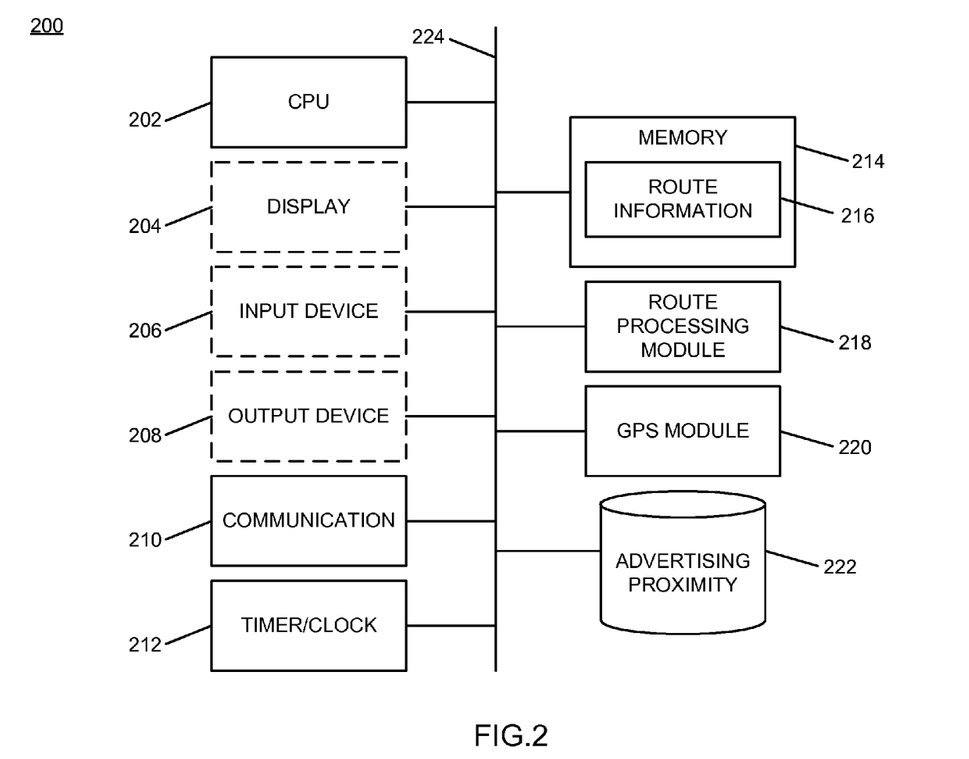
FIG. 2 is a block diagram of an example of an implementation of a core processing module capable of performing automated advertising proximity route selection according to an embodiment of the present subject matter.

FIG. 2 is a block diagram of an example of an implementation of the core processing module 200 capable of performing automated advertising proximity route selection. The core processing module 200 may be associated with either the computing device 102 or the route server 106. Alternatively, the core processing module 200 may be associated with each of the computing device 102 and the route server 106 with the processing described above and in more detail below partitioned between two core processing modules, as appropriate for a given implementation. For purposes of the present example and the following process descriptions, it is assumed that the core processing module and its associated processing are performed via a single device for ease of illustration and description purposes. However, it is understood that processing for communication of information and results may be performed by either the computing device 102 or the route server 106, or partitioned between the two devices.

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), projection, touchscreen, or other display element or panel. The input device 206 may include a computer keyboard, a keypad, a mouse, a pen, a joystick, or any other type of input device by which the user may interact with and respond to information on the display 204. Alternatively, for implementation in association with the computing device 102, the display 204 may be combined with the input device 206 into a single unit as a touch-screen display device. Many other variations for user interface functionality are possible and all are considered within the scope of the present subject matter.

An output device 208 is also illustrated. The output device 208 may include circuitry for driving a speaker or other audio output device, and may also include a speaker as appropriate for a given implementation. The speaker may include a standard coil-driven speaker, electroacoustic transducer, a piezoelectric speaker, a digitally-driven speaker, or other device capable of producing audio output as appropriate for a given implementation.

It should be noted that the display 204, the input device 206, and the output device 208 are illustrated with a dashed-line representation within FIG. 2 to indicate that they may be optional components for the core processing module 200 for certain implementations, such as in association with the route server 106. Accordingly, the core processing module 200 may operate as a completely automated embedded device without user configurability or feedback. However, the core processing module 200 may also provide user feedback and configurability via the display 204 and the output device 208, and the input device 206, respectively.

A communication module 210 provides interconnection capabilities that allow the core processing module 200 to communicate with other modules within the system 100, such as the route server 106, to perform the automated advertising proximity route selection. The communication module 210 may include any electrical, protocol, and protocol conversion capabilities useable to provide the interconnection capabilities. Though the communication module 210 is illustrated as a component-level module for ease of illustration and description purposes, it should be noted that the communication module 210 may include any hardware, programmed processor(s), and memory used to carry out the functions of the communication module 210 as described above and in more detail below. For example, the communication module 210 may include additional controller circuitry in the form of application specific integrated circuits (ASICs), processors, antennas, and/or discrete integrated circuits and components for performing communication and electrical control activities associated with the communication module 210. Additionally, the communication module 210 may include interrupt-level, stack-level, and application-level modules as appropriate. Furthermore, the communication module 210 may include any memory components used for storage, execution, and data processing for performing processing activities associated with the communication module 210. The communication module 210 may also form a portion of other circuitry described without departure from the scope of the present subject matter.

A timer/clock module 212 is illustrated and used to determine timing and date information, such as a day, week, month, etc., as described above. As such, the core processing module 200 may utilize information derived from the timer/clock module 212 for information processing activities, such as the adaptive behavioral-based routing capabilities described above.

A memory 214 includes a route information storage area 216 that stores advertising proximity route information derived by or received for processing by the core processing module 200. As will be described in more detail below, the advertising proximity route information stored within the route information storage area 216 is used to process and select routes proximate to physical advertising for the mobile device 102 in response to route requests from a route requester (e.g., a user of the mobile device 102).

It is understood that the memory 214 may include any combination of volatile and non-volatile memory suitable for the intended purpose, distributed or localized as appropriate, and may include other memory segments not illustrated within the present example for ease of illustration purposes. For example, the memory 214 may include a code storage area, a code execution area, and a data area without departure from the scope of the present subject matter.

A route processing module 218 is also illustrated. The route processing module 218 provides processing capabilities for route requests and route selection for the core processing module 200, as described above and in more detail below. The route processing module 218 implements the automated advertising proximity route selection of the core processing module 200.

Though the route processing module 218 is illustrated as a component-level module for ease of illustration and description purposes, it should be noted that the route processing module 218 may include any hardware, programmed processor(s), and memory used to carry out the functions of this module as described above and in more detail below. For example, the route processing module 218 may include additional controller circuitry in the form of application specific integrated circuits (ASICs), processors, and/or discrete integrated circuits and components for performing communication and electrical control activities associated with the respective devices. Additionally, the route processing module 218 may also include interrupt-level, stack-level, and application-level modules as appropriate. Furthermore, the route processing module 218 may include any memory components used for storage, execution, and data processing for performing processing activities associated with the module.

It should also be noted that the route processing module 218 may form a portion of other circuitry described without departure from the scope of the present subject matter. Further, the route processing module 218 may alternatively be implemented as an application stored within the memory 214. In such an implementation, the route processing module 218 may include instructions executed by the CPU 202 for performing the functionality described herein. The CPU 202 may execute these instructions to provide the processing capabilities described above and in more detail below for the core processing module 200. The route processing module 218 may form a portion of an interrupt service routine (ISR), a portion of an operating system, a portion of a browser application, or a portion of a separate application without departure from the scope of the present subject matter.

A global positioning system (GPS) module 220 provides positioning location coordinates usable for identifying a present physical and/or logical location of the computing device 102. The GPS module 220 may also be used to identify a physical and/or logical location of advertising proximate to selected routes and a location of a destination associated with a requested route. Location identification information generated by the GPS module 220 may be stored within the route information storage area 216 for use by the core processing module 200.

An advertising proximity database 222 is associated with the core processing module 200 and provides storage capabilities for information associated with the automated advertising proximity route selection of the core processing module 200. The advertising proximity database 222 is represented as a single database within the example of FIG. 2. However, it is understood that the advertising proximity database 222 may include the information stored within one or more of the advertising location information database 108, the geographic information database 110, and the profile database 112 of FIG. 1, as appropriate for a given implementation.

The CPU 202, the display 204, the input device 206, the output device 208, the communication module 210, the timer/clock module 212, the memory 214, the route processing module 218, the GPS module 220, and the advertising proximity database 222 are interconnected via an interconnection 224. The interconnection 224 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204, the input device 206, and the output device 208 may be located at a point of sale device, kiosk, or other location, while the CPU 202 and memory 214 may be located at a local or remote server. Many other possible arrangements for components of the core processing module 200 are possible and all are considered within the scope of the present subject matter. It should also be understood that, though the advertising proximity database 222 is shown as a single device, the information stored by the advertising proximity database 222 may also be stored within the memory 214 without departure from the scope of the present subject matter. Accordingly, the core processing module 200 may take many forms and may be associated with many platforms.

Figure 3:
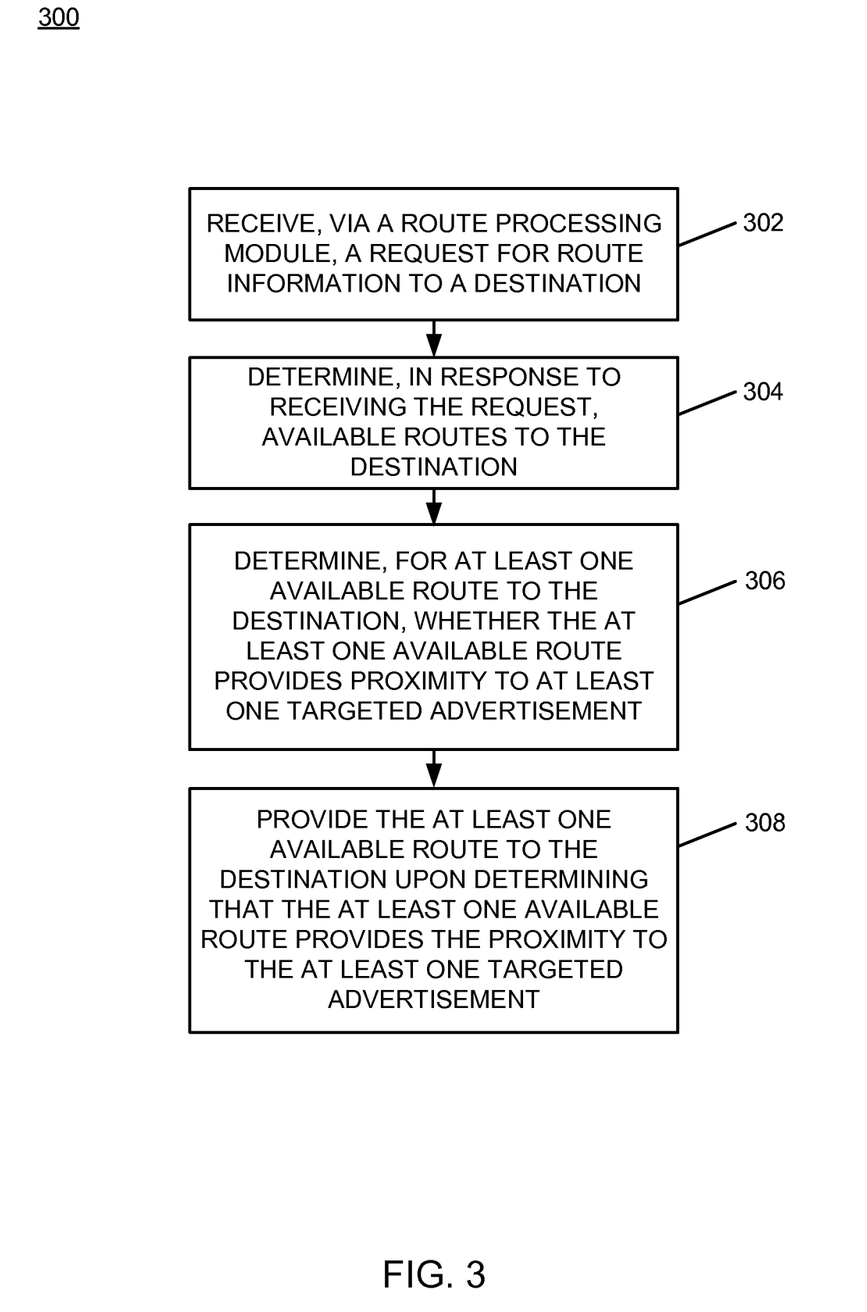
FIG. 3 is a flow chart of an example of an implementation of a process for automated advertising proximity route selection according to an embodiment of the present subject matter.
Figure 4A:
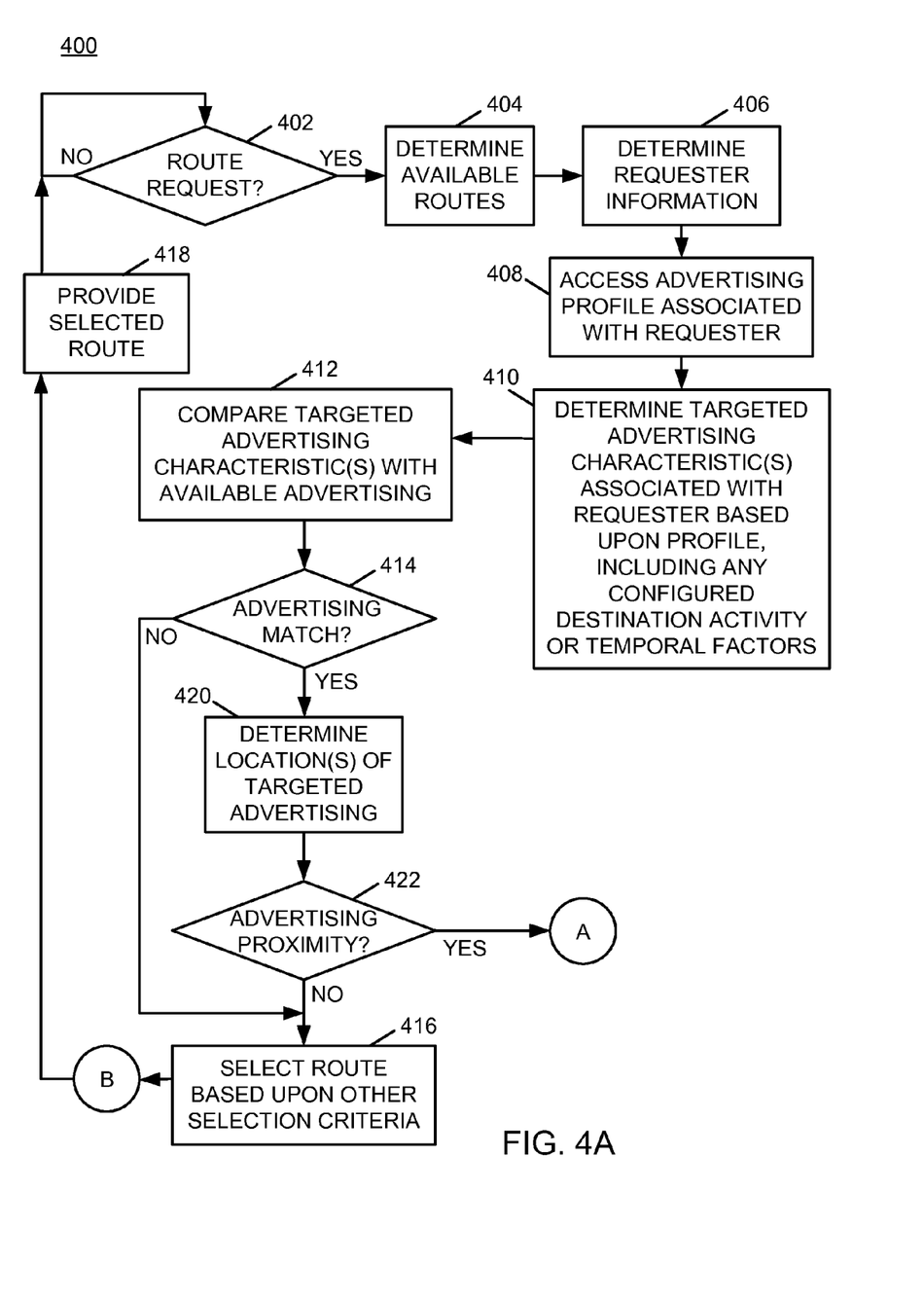
FIG. 4A is a flow chart of an example of an implementation of initial processing associated with a process for advertising proximity route selection according to an embodiment of the present subject matter.
Figure 4B:
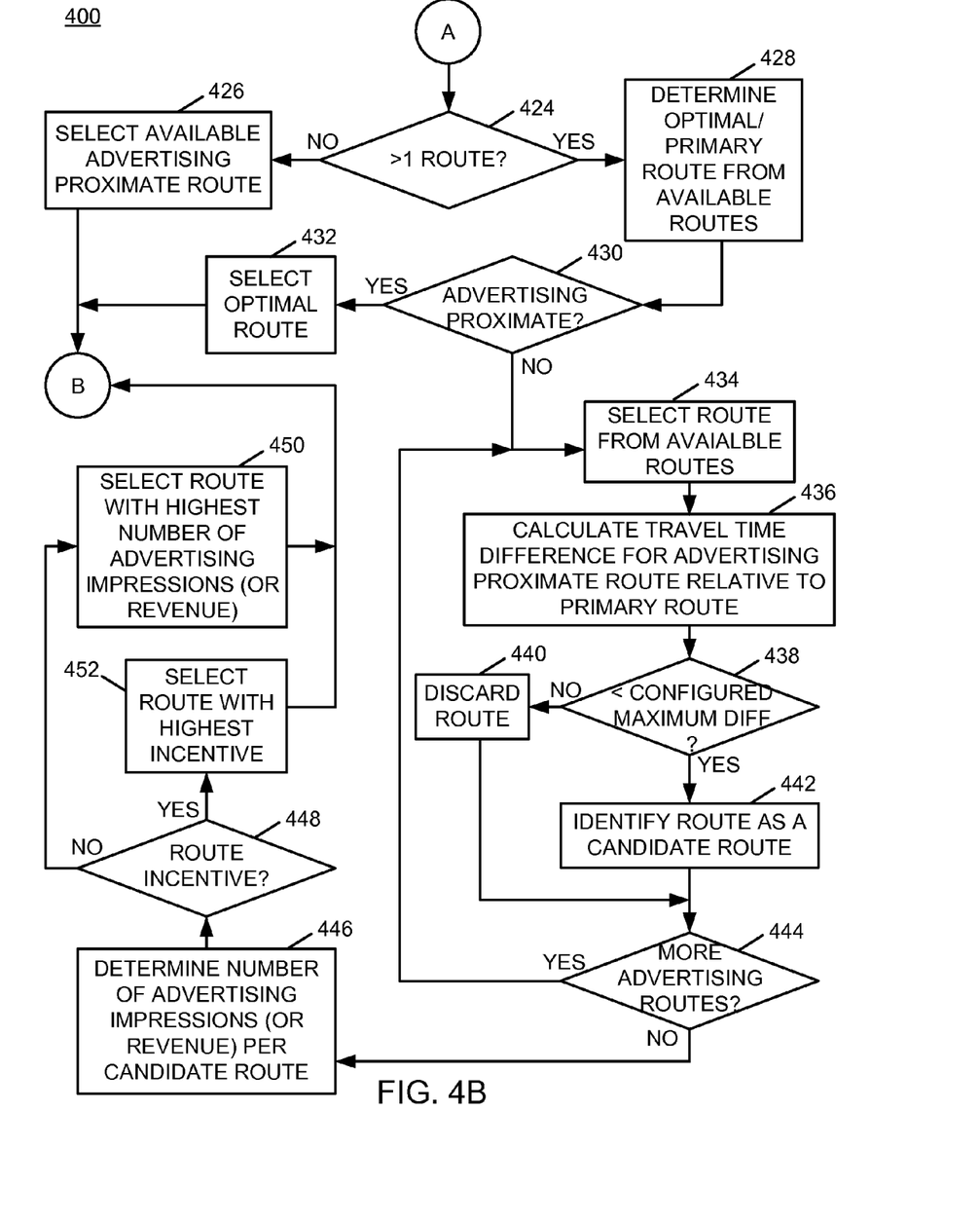
FIG. 4B is a flow chart of an example of an implementation of additional processing associated with a process for advertising proximity route selection according to an embodiment of the present subject matter.
Figure 5:
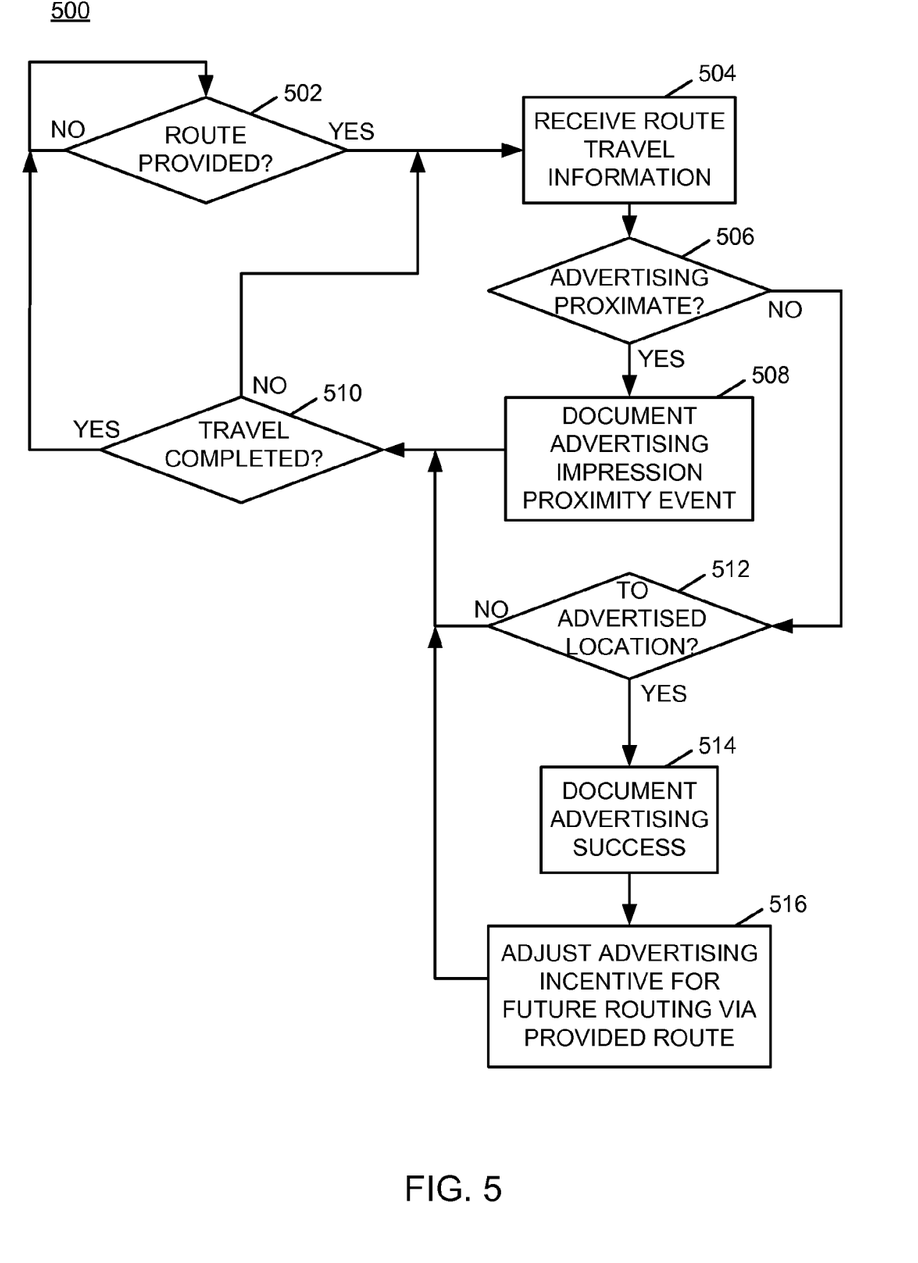
FIG. 5 is a flow chart of an example of an implementation of a process for advertising proximity route monitoring according to an embodiment of the present subject matter.

FIG. 3 through FIG. 5 below describe example processes that may be executed by devices, such as the core processing module 200, to perform the automated advertising proximity route selection associated with the present subject matter. Many other variations on the example processes are possible and all are considered within the scope of the present subject matter. The example processes may be performed by modules, such as the route processing module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated advertising proximity route selection. At block 302, the process 300 receives, via a route processing module, a request for route information to a destination. At block 304, the process 300 determines, in response to receiving the request, available routes to the destination. At block 306, the process 300 determines, for at least one available route to the destination, whether the at least one available route provides proximity to at least one targeted advertisement. At block 308, the process 300 provides the at least one available route to the destination upon determining that the at least one available route provides the proximity to the at least one targeted advertisement.

FIGS. 4A-4B illustrate a flow chart of an example of an implementation of a process 400 for advertising proximity route selection. FIG. 4A illustrates initial processing associated with the process 400. At decision point 402, the process 400 makes a determination as to whether a request for route information to a destination has been received. In response to a determination that a request for route information to a destination has been received, the process 400 determines available routes to the destination at block 404. At block 406, the process 400 determines requester (e.g., user) information. At block 408, the process 400 accesses an advertising profile associated with the route requester to obtain information. As described above, a profile may be configured by a route requester and the process 400 may access the profile to determine route requester information associated with the request for route information to the destination.

At block 410, the process 400 determines (e.g., identifies) at least one targeted advertising characteristic associated with the route requester based upon the profile and the associated the route requester information, including any configured destination activity and/or temporal factors associated with the route request or associated with a time period during which the request is received. As described above, a temporal factor may include a time of day, week, month, year, etc., including holiday or weekend getaways.

At block 412, the process 400 compares the targeted advertising characteristic(s) with available advertisements. At decision point 414, the process 400 makes a determination as to whether a match exists between the targeted advertising characteristic(s) and at least one of the available advertisements. A match may include determining at least one targeted advertisement directed toward or potentially appealing to the route requester.

In response to a determination that no advertising match exists at decision point 414, the process 400 selects a route based upon at least one other selection criterion at block 416, such as a shortest available route or a route that meets a criterion of traffic or other criterion. The process 400 provides the selected route to the route requester at block 418 and returns to decision point 402 to await another route request and continues processing as described above. It should be understood that the additional processing described below provides for selection of advertising proximate to at least one available route and that in response to such a selection, the process 400 may provide an advertising proximate route at block 418.

It should be understood that providing the selected route to the route requester at block 418 may include displaying the requested route via the display 204 of the core processing module 200 for an implementation where the core processing module 200 is implemented in the computing device 102. Additionally, providing the selected route may also include generation of audio output signals, such as audio cues for driving directions, via the output device 208 of the core processing module 200. Where the core processing module 200 is implemented in a server, such as the route server 106, providing the selected route may include sending the selected route to the computing device 102 for use by the route requester. In response to receipt of the selected route, a core processing module 200 of the computing device 102 may provide the selected route as either visual or audio output as described above. Many other variations are possible for partitioning the processing described herein and for providing selected routes to route requesters and all are considered within the scope of the present subject matter.

Returning to the description of decision point 414, in response to a determination that an advertising match exists, the process 400 determines a location associated with each targeted advertisement determined to match the targeted advertising characteristic(s) at block 420. At decision point 422, the process 400 makes a determination as to whether, for at least one available route to the destination, proximity to at least one targeted advertisement is provided.

In response to a determination at decision point 422 that no available route provides proximity to at least one targeted advertisement, the process 400 returns to block 416 and iterates as described above. In response to a determination at decision point 422 that at least one available route provides proximity to at least one targeted advertisement, the process 400 transitions to the processing shown and described in association with FIG. 4B.

FIG. 4B illustrates additional processing associated with the process 400 for advertising proximity route selection. At decision point 424, the process 400 makes a determination as to whether more than one (1) available route has been identified with advertising proximate to the available route. In response to a determination at decision point 424 that more than one available route has not been identified with advertising proximate to the available route, the process 400 selects the available advertising proximate route at block 426 and returns to block 418 (See FIG. 4A) to provide the selected advertising proximate route to the route requester and iterates as described above.

In response to a determination at decision point 424 that more than one available route has been identified with advertising proximate to the available route, the process 400 determines an optimal route (e.g., primary, such as for purposes of comparison) from the available routes at block 428. The optimal/primary route may include a route having a shortest travel distance or travel time, a least amount of traffic, a least amount of road construction, or other characteristic that makes the selected route optimal for purposes of comparison.

At decision point 430, the process 400 makes an additional determination as to whether the optimal route provides advertising proximity In response to a determination that the optimal route further provides advertising proximity, the process 400 selects the optimal route as the selected advertising proximate route at block 432 and returns to block 418 (See FIG. 4A) to provide the selected advertising proximate route to the route requester and iterates as described above.

In response to a determination at decision point 430 that the optimal route does not provide advertising proximity, the process 400 selects a first of the available routes that provides proximity to at least one targeted advertisement for processing at block 434. At block 436, the process 400 calculates a travel time difference associated with the selected available route that provides proximity to at least one targeted advertisement relative to the optimal route. At decision point 438, the process 400 makes a determination as to whether the calculated travel time difference associated with the selected available route is less than a configured maximum travel time difference. As described above, a route requester may provide a maximum travel time difference configuration value via a profile.

In response to a determination at decision point 438 that the calculated travel time difference associated with the selected available route is not less than the configured maximum travel time difference, the process 400 discards the selected available route at block 440. In response to a determination at decision point 438 that the calculated travel time difference associated with the selected available route is less than the configured maximum travel time difference, the process 400 identifies the selected route as a candidate route at block 442.

In response to completion of identification of the route as a candidate route at block 442 or discarding the selected available route at block 440, the process 400 makes a determination at decision point 444 as to whether additional advertising routes are available for consideration and processing. In response to a determination at decision point 444 that more advertising routes are available for consideration and processing, the process 400 returns to block 434 and selects a next available route from the available advertising routes for processing. The process 400 iterates as described above to identify candidate advertising routes for selection based upon a configured maximum travel time difference. It should be noted that where no travel time difference is configured, the process 400 may omit processing of block 434 through decision point 444. This additional decision point is omitted for brevity and ease of description purposes.

In response to a determination at decision point 444 that no additional advertising routes are available for consideration and processing associated with a configured maximum travel time difference (if configured), the process 400 determines a number of advertising impressions per candidate route at block 446. It should be noted that the process 400 may also determine revenue generation potential from the associated advertising impressions to further refine advertising proximity route selection at block 446.

At decision point 448, the process 400 makes a determination as to whether a route incentive is associated with any of the candidate routes. A route advertising incentive may be defined by an advertiser, for example, and may be received via the advertising server 114. Alternatively, the route advertising incentive may be retrieved from the advertising location information database 108, as appropriate for a given implementation.

In response to a determination at decision point 448 that none of the candidate routes has an associated route incentive, the process 400 selects the candidate route with the highest number of advertising impressions (and/or revenue generation potential) at block 450. In response to a determination at decision point 448 that at least one of the candidate routes has an associated route incentive, the process 400 selects the candidate route with the highest route incentive at block 452.

In response to either the selection of the route with the highest route incentive at block 452 or selection of the route with the highest number of advertising impressions (and/or revenue generation potential) at block 450, the process 400 returns to block 418 (See FIG. 4A) to provide the selected advertising proximate route to the route requester and iterates as described above.

As such, the process 400 determines targeted advertising characteristics associated with a route requester and selects targeted advertisements directed to the targeted advertising characteristics. The process 400 determines whether any of the targeted advertisements are proximate to any available routes to the destination associated with a route request. The process 400 considers any available travel time difference that is configured for the route requester and marks any available routes that meet the configured travel time difference as candidate routes for selection. The process 400 further considers advertising impressions (and/or revenue generation potential) for the candidate routes and refines the route selection process using available configured incentives for route selection associated with any physical advertising proximate to the candidate routes. The process 400 provides the selected route to the route requester. Route monitoring for provided routes is considered in association with FIG. 5 described below.

FIG. 5 is a flow chart of an example of an implementation of a process 500 for advertising proximity route monitoring. At decision point 502, the process 500 makes a determination as to whether a route has been provided in response to a route request. As such, the process 500 may be invoked or initiated in response to providing a route via a process, such as the process 400 of FIGS. 4A and 4B described above.

In response to a determination that a route has been provided, the process 500 receives route travel information at block 504. The route travel information may include initially receiving the provided route, and periodically or randomly receiving route information, using the computing device 102, in the form of coordinates or other location information as the route is traveled by the route requester. For example, route information may be received in response to queries of the computing device 102 for location information or the route information may be stored locally or may be accessible via the core processing module 200 at either the computing device 102 or the route server 106.

At decision point 506, the process 500 makes a determination as to whether the provided route has been traversed to a location proximate to a physical advertisement. As such, the process 500 makes a determination as to whether a route requester travels at least a portion of a provided available route to the destination that provides proximity to at least one targeted advertisement. For purposes of the present description, where a route is traversed proximate to a physical advertisement, such proximity may be considered an advertising impression proximity event. In response to determining that the provided route has been traversed to a location proximate to a physical advertisement, the process 500 documents the advertising impression proximity event at block 508. As such, the process 500 documents an advertising impression proximity event associated with each targeted advertisement proximate to a traveled portion of the provided route. Documentation of an advertising event may include communicating the advertising impression to the advertising server 114, such as by sending a message to the advertising server 114 identifying the advertising impression proximity event.

At decision point 510, the process 500 makes a determination as to whether travel has been completed relative to the provided route. In response to a determination that travel has not been completed, the process 500 returns to block 504 to receive route travel information in the form of location information for the computing device 102, and iterates as described above.

Returning to the description of decision point 506, in response to a determination that the present route location is not a location proximate to a physical advertisement, a determination is made at decision point 512 as to whether the present location is associated with an advertised location (e.g., a merchant facility, a park, etc. associated with advertising proximate to the provided route). As such, the process 500 determines whether a route requester travels to a location associated with a targeted advertisement proximate to the provided route.

In response to a determination at decision point 512 that the present location is associated with an advertised location, the process 500 documents the advertising success at block 514. At block 516, the process 500 adjusts an advertising incentive associated with future routing via the provided route. The adjusted incentive may be utilized in future route selection processing, as described above in association with the process 400 of FIGS. 4A and 4B. Adjusting the advertising incentive associated with future routing via the provided route may include communicating the documented advertising success to the advertising server 114, such as by sending a message to the advertising server 114 indicating that the route requester traveled to the location, in response to which the advertising server 114 may adjust an advertising incentive or routing incentive associated with future routing via the provided available route. The advertising server 114 may store the advertising incentive or routing incentive, for example, within the advertising location information database 108 or other location appropriate for a given implementation.

Returning to decision point 512, in response to determining that the route requested has not traveled to an advertised location, or in response to completion of adjusting the advertising incentive associated with future routing via the provided route at block 516, the process 500 returns to decision point 510 to determine whether travel has been completed (e.g., by arrival at the destination). In response to a determination that travel has been completed, the process 500 returns to decision point 502 to await another indication that a route has been provided.

As such, the process 500 receives route information and documents advertising impressions. The process 500 also documents advertising successes and initiates adjustment of advertising incentives for successful advertising. It should further be noted that, as described above, advertising success may be measured over a configurable time period, such as hours, days, or weeks, for example, without departure from the scope of the present subject matter.

As described above in association with FIG. 1 through FIG. 5, the example systems and processes provide advertising proximity route selection. Many other variations and additional activities associated with advertising proximity route selection are possible and all are considered within the scope of the present subject matter.

Thus, in response to receipt of a request for route information to a destination at a route processing module, for at least one available route to the destination, a determination is made as to whether at least one available route provides proximity to at least one targeted advertisement. At least one available route to the destination is provided upon determining that at least one available route provides proximity to at least one targeted advertisement.

Determining, for at least one available route to the destination, whether at least one available route provides proximity to at least one targeted advertisement may include determining at least one targeted advertisement and a location associated with each targeted advertisement. A determination may be made as to whether the location associated with each targeted advertisement is proximate to at least one route. Determining, for at least one available route to the destination, whether at least one route provides proximity to at least one targeted advertisement may include determining targeted advertising associated with at least one activity associated with the destination and/or a temporal factor associated with a time period during which the request is received.

Determining at least one targeted advertisement may include determining route requester information and determining a targeted advertising characteristic associated with the route requester. The targeted advertising characteristic may be compared with available advertisements and a determination may be made as to whether a match between the targeted advertising characteristic and at least one of the available advertisements exists. Determining a targeted advertising characteristic associated with the route requester may include accessing a profile associated with the route requester and identifying the targeted advertising characteristic associated with the route requester based upon the profile.

Determining, for at least one available route to the destination, whether the available route provides proximity to at least one targeted advertisement may include determining a primary route among a group of available routes and calculating a travel time difference associated with each route that provides proximity to at least one targeted advertisement relative to the primary route. A determination may be made as to whether the travel time difference associated with each route is less than a configured maximum travel time difference and a route may be provided with an associated travel time difference less than the configured maximum travel time difference.

Additionally, a determination may be made as to whether the router requester travels at least a portion of the provided route to the destination that provides the proximity to the targeted advertisement and an advertising impression proximity event may be documented in association with each targeted advertisement proximate to the traveled portion of the provided route. Further, a determination may be made as to whether the route requester travels to a location associated with a targeted advertisement proximate to the provided route and an advertising incentive associated with future routing via the provided route may be adjusted.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving a request for route information to a destination from a route requester;
    determining, in response to receiving the request, available routes to the destination;
    determining, via a processor for at least one available route to the destination using advertising physical location information of advertisements located remotely from advertised businesses and close to travel routes, whether the at least one available route travels near at least one targeted advertisements that is physically located remotely from an advertised business at an advertising location proximate to the at least one available route;
    providing the at least one available route to the destination upon determining that the at least one available route travels near the at least one targeted advertisement;
    determining whether the route requester travels to an advertised physical location advertised by a targeted advertisement that the route requester traveled near while traveling along the provided at least one available route; and
    sending a message indicating that the route requester traveled to the advertised physical location advertised by the targeted advertisement to an advertising server that adjusts an advertising incentive associated with future routing via the provided at least one available route.

2. The method of claim 1, where determining, via the processor for at least one available route to the destination using the advertising physical location information of advertisements located remotely from advertised businesses and close to travel routes, whether the at least one available route travels near the at least one targeted advertisement that is physically located remotely from the advertised business at the advertising location proximate to the at least one available route comprises:
    determining the at least one targeted advertisement;
    determining a physical location of each of the at least one targeted advertisement relative to the at least one available route; and
    determining whether the physical location of each of the at least one targeted advertisement is within view of the route requester near the at least one available route.

3. The method of claim 2, where determining the at least one targeted advertisement comprises:
    determining route requester information comprising characteristics, interests, and advertising preferences of the route requester;
    determining a targeted advertising characteristic of the route requester based upon the route requester information;
    comparing the targeted advertising characteristic of the route requester with available advertisements; and
    determining a match between the targeted advertising characteristic of the route requester and at least one of the available advertisements.

4. The method of claim 3, where determining a targeted advertising characteristic of the route requester comprises:
    accessing a route requester profile associated with the route requester; and
    identifying the targeted advertising characteristic of the route requester based upon the route requester profile.

5. The method of claim 1, where determining, via the processor for at least one available route to the destination using the advertising physical location information of advertisements located remotely from advertised businesses and close to travel routes, whether the at least one available route travels near the at least one targeted advertisement that is physically located remotely from the advertised business at the advertising location proximate to the at least one available route comprises:
    determining a primary route among a plurality of available routes;
    calculating a travel time difference associated with each available route that provides proximity to the advertising location of the at least one targeted advertisement relative to the primary route;
    determining whether the travel time difference associated with each available route is less than a configured maximum travel time difference; and
    where providing the at least one available route to the destination upon determining that the at least one available route travels near the at least one targeted advertisement comprises providing a route with an associated travel time difference less than the configured maximum travel time difference.

6. The method of claim 1, where determining, via the processor for at least one available route to the destination using the advertising physical location information of advertisements located remotely from advertised businesses and close to travel routes, whether the at least one available route travels near the at least one targeted advertisement that is physically located remotely from the advertised business at the advertising location proximate to the at least one available route comprises determining targeted advertising associated with at least one of an activity associated with the destination and a temporal factor associated with a time period during which the request is received.

7. The method of claim 1, further comprising:
- determining whether the route requester travels at least a portion of the provided at least one available route to the destination that travels near the at least one targeted advertisement that is physically located remotely from the advertised business at the advertising location proximate to the at least one available route; and
- sending a message to the advertising server identifying an advertising impression proximity event associated with each of the at least one targeted advertisement that the route requester traveled near while traveling along the traveled portion of the provided at least one available route.

* * * * *